(12) United States Patent
Saxena et al.

(10) Patent No.: US 7,293,130 B2
(45) Date of Patent: Nov. 6, 2007

(54) METHOD AND SYSTEM FOR A MULTI-LEVEL MEMORY

(75) Inventors: Rahul Saxena, Sunnyvale, CA (US); Hitesh Rastogi, San Jose, CA (US); Ashwani Oberai, Milpitas, CA (US)

(73) Assignee: Intel Corporation, Santa Clara, CA (US)

( * ) Notice: Subject to any disclaimer, the term of this patent is extended or adjusted under 35 U.S.C. 154(b) by 1044 days.

(21) Appl. No.: 10/159,317

(22) Filed: May 29, 2002

(65) Prior Publication Data

US 2003/0223415 A1 Dec. 4, 2003

(51) Int. Cl.
*G06F 12/00* (2006.01)
(52) U.S. Cl. .......................................... 711/2; 711/156
(58) Field of Classification Search ...................... None
See application file for complete search history.

(56) References Cited

U.S. PATENT DOCUMENTS

| | | | |
|---|---|---|---|
| 5,539,893 A * | 7/1996 | Thompson et al. | 711/122 |
| 5,864,539 A * | 1/1999 | Yin | 370/236 |
| 5,995,998 A | 11/1999 | Liang | |
| 6,324,628 B1 | 11/2001 | Chan | |
| 6,393,021 B1 | 5/2002 | Chow et al. | |
| 6,430,661 B1 | 8/2002 | Larson et al. | |
| 6,606,326 B1 * | 8/2003 | Herring | 370/412 |
| 6,735,679 B1 | 5/2004 | Herbst et al. | |
| 6,832,265 B1 * | 12/2004 | Ma et al. | 709/250 |
| 6,940,814 B1 * | 9/2005 | Hoffman | 370/235 |
| 6,977,940 B1 | 12/2005 | Ahlfors et al. | |
| 2002/0099918 A1 * | 7/2002 | Avner et al. | 711/170 |
| 2002/0172229 A1 | 11/2002 | Parvin et al. | |
| 2002/0188839 A1 | 12/2002 | Noehring et al. | |
| 2003/0103514 A1 | 6/2003 | Nam et al. | |
| 2006/0036705 A1 * | 2/2006 | Musoll et al. | 709/210 |

OTHER PUBLICATIONS

U.S. Appl. No. 10/159,616 titled Method and System to Synchronize a Multi-Level Memory filed May 29, 2002 intventor Saxena et al. Application Pending.

* cited by examiner

*Primary Examiner*—Reginald Bragdon
*Assistant Examiner*—Thanh D. Vo
(74) *Attorney, Agent, or Firm*—Blakely, Sokoloff, Taylor & Zafman LLP

(57) ABSTRACT

A method and system is provided for a multi-level memory. The system includes an internal memory and an external memory. Data packets are received through one or more input ports and initially stored in the internal memory. A control unit determines whether there is congestion of resources within the system and transfers data packets to external memory to ease the congestion. Data packets are eventually transferred from the internal or external memory to one or more output ports.

24 Claims, 7 Drawing Sheets

METHOD AND SYSTEM FOR A MULTI-LEVEL MEMORY

BACKGROUND

1. Field

The invention relates to the field of network switches. In particular, the invention relates to a multi-level memory mechanism in network switches.

2. Background Information and Description of Related Art

Data networking devices, such as a network switch, may use a store and forward mechanism to route data frames. These devices store and process frames at a high rate but also provide for large storage capacity to store a large number of frames in case of congestion.

Currently, these devices either have an internal memory or an external memory. A device with an internal memory provides for high bandwidth, but since the physical size of the chip is limited, the size of the memory is limited. Therefore, storage capacity is limited. A device with an external memory provides for high storage capacity. However, the limited pin count of the device limits the width of the data bus that can be used to access the external memory. Therefore, bandwidth is limited.

BRIEF DESCRIPTION OF DRAWINGS

The invention may best be understood by referring to the following description and accompanying drawings that are used to illustrate embodiments of the invention. In the drawings.

DETAILED DESCRIPTION

Embodiments of a system and method for synchronizing a multi-level memory are described. In the following description, numerous specific details are set forth. However, it is understood that embodiments of the invention may be practiced without these specific details. In other instances, well-known circuits, structures and techniques have not been shown in detail in order not to obscure the understanding of this description.

Reference throughout this specification to "one embodiment" or "an embodiment" means that a particular feature, structure, or characteristic described in connection with the embodiment is included in at least one embodiment of the invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
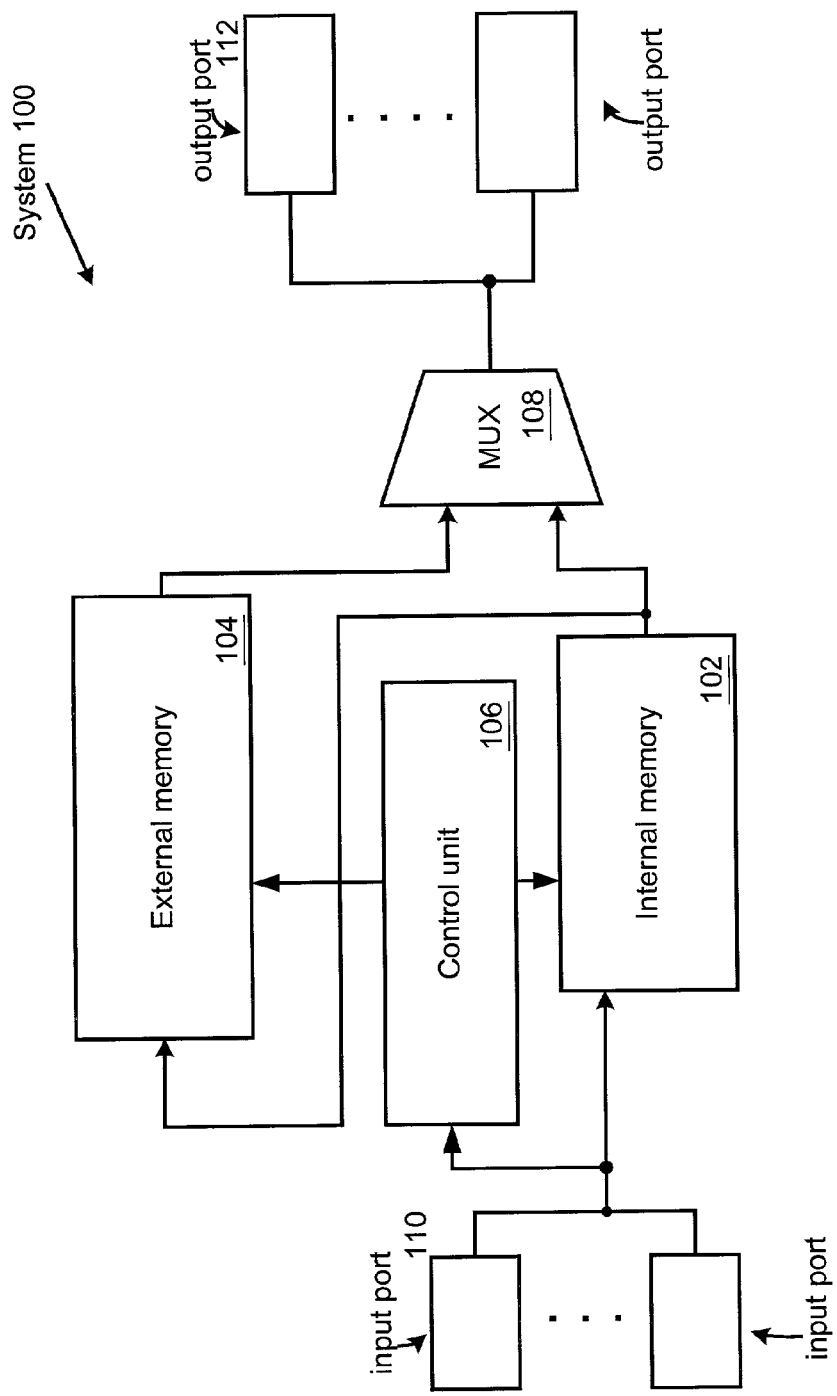
FIG. 1 illustrates a system implementing an embodiment of the invention.

Referring to FIG. 1, a block diagram illustrates a system 100 according to one embodiment of the invention. Those of ordinary skill in the art will appreciate that the system 100 may include more components than those shown in FIG. 1. However, it is not necessary that all of these generally conventional components be shown in order to disclose an illustrative embodiment for practicing the invention. System 100 includes an internal memory 102 and an external memory 104. Both memories store data packets.

Data packets are received through one or more input ports 110. The data packets are first stored in internal memory 102. Information about each data packet, such as destination address, format, and type, is collected by a control unit 106. Control unit 106 determines whether to transfer the data packets to the external memory 104 based on congestion of resources within system 100. The data packets are then transferred from internal or external memory to one or more output ports 112.

In one embodiment of the invention, the control unit 106 determines whether to transfer the data packet to the external memory 104 based on congestion of memory resources. For example, if congestion of the internal memory 102 is above a predetermined threshold, the control unit transfers the data packet to the external memory 104 to ease the congestion of the internal memory. The data packet is then transmitted from the external memory 104 to an output port.

In one embodiment of the invention, the memory resources map to an output port. In this case, the control unit 106 determines the internal memory usage per output port and decides whether to transfer the data packet to the external memory 104 based on internal memory congestion per output port.

In one embodiment of the invention, the memory resources map to an input port. In this case, the control unit 106 determines the internal memory usage per input port and decides to transfer the data packet to the external memory 104 based on internal memory congestion per input port.

In one embodiment of the invention, system 100 includes one or more data packet queues to represent the order in which the data packets will be transferred to external memory or an output port. In one embodiment, the control unit 106 determines whether to transfer the data packet to the external memory 104 based on congestion of the data packet queues.

Figure 2:
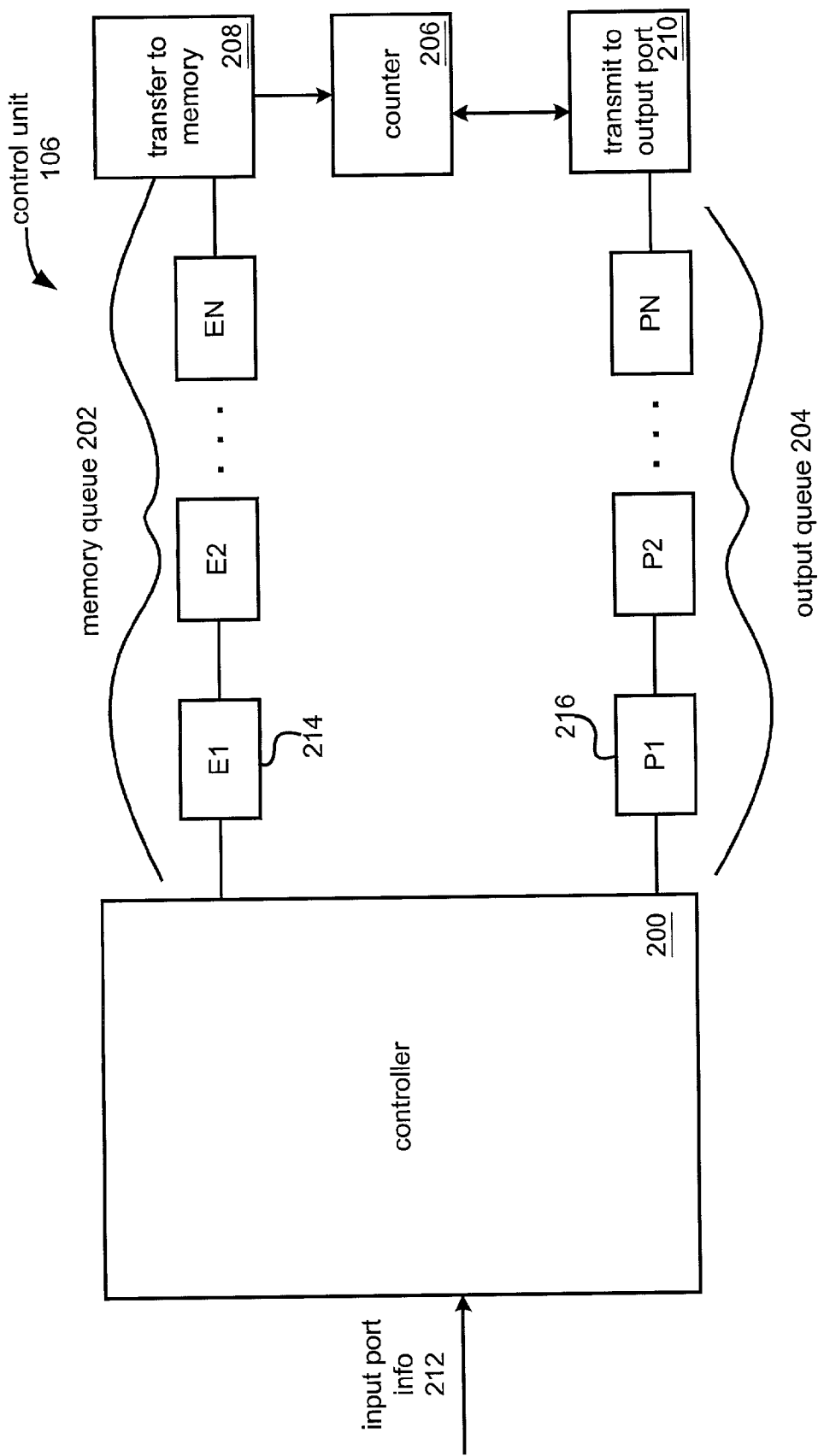
FIG. 2 illustrates a control unit according to one embodiment of the invention.

FIG. 2 shows control unit 106 implementing data packet queues according to one embodiment of the invention. The control unit in FIG. 2 has two types of data packet queues: memory queue 202 and output queue 204. The memory queue 202 represents the order in which data packets will be transmitted to external memory 104. The output queue 204 represents the order in which data packets will be transmitted to an output port 112. In one embodiment, the control unit 106 has one memory queue and one output queue for each output port.

In one embodiment of the invention, one or more tokens are generated for each data packet to represent the data packet in one or more queues. As described above, the control unit 106 determines whether a data packet will be transferred to external memory 104. If a data packet is to be transferred from the internal memory 102 to external memory 104, a token 214 is generated for the data packet, and the token is placed at the end of the memory queue 202. The token 214 contains information about the data packet, such as the address in the internal memory where the data packet is stored. When the token 214 reaches the head of memory queue 202, the data packet will be retrieved from internal memory 102 and transferred to external memory 204.

Whether or not a data packet will be transferred to external memory, a token 216 is generated for the data packet and placed at the end of the output queue 204. The token 216 contains information about the data packet, such as the output port to which the data packet should be transferred, whether the data packet is stored in internal or external memory, and the address in internal or external memory where the data packet is stored. When the token 216 reaches the head of the output queue 204, the data packet is retrieved from internal or external memory and transferred to an output port.

Due to latency in the memory queue, an output token corresponding to a data packet may sometimes reach the head of the output queue before the memory token corresponding to the same data packet reaches the head of the memory queue. If the system is not synchronized, there will be an attempt to retrieve the data packet from external memory when the data packet is still being stored in internal memory.

In one embodiment of the invention, control unit 106 includes one or more counters 206 to synchronize the transfer of data packets. Each counter corresponds to one output port. When a data packet is transferred from internal memory to external memory, the counter corresponding to the output port to which the data packet will eventually be transferred is incremented. Before a data packet is transferred from external memory to an output port, the counter corresponding to the output port is checked. If the counter is not zero, the data packet is transferred from external memory to the output port, and the corresponding counter is decremented. If the counter is zero, indicating that the data packet is still being stored in internal memory, then no attempt is made to transfer the data packet out of external memory to the output port until the data packet has been transferred to the external memory.

Figure 3:
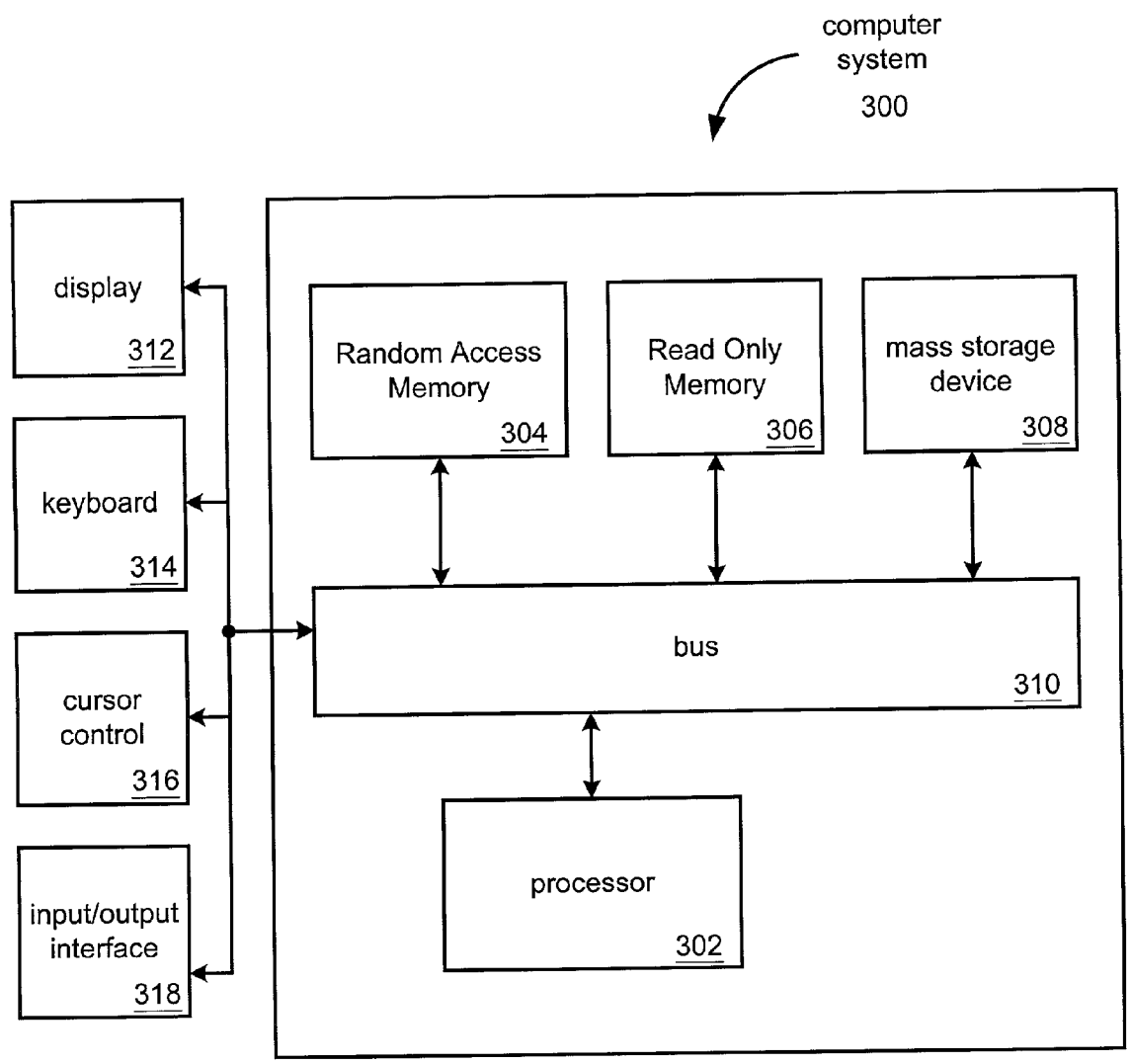
FIG. 3 is a block diagram of a computer system which may be used to implement an embodiment of the invention.

FIG. 3 illustrates a block diagram of a computer system 300 that may be used to implement an embodiment of the invention. The computer system 300 includes a processor 302 coupled through a bus 310 to a random access memory (RAM) 304, a read-only memory (ROM) 306, and a mass storage device 308. Mass storage device 308 represents a persistent data storage device, such a floppy disk drive, fixed disk drive (e.g. magnetic, optical, magneto-optical, or the like), or streaming tape drive. Processor 302 may be embodied in a general purpose processor, a special purpose processor, or a specifically programmed logic device.

Display device 312 is coupled to processor 302 through bus 310 and provides graphical output for computer system 300. Keyboard 314 and cursor control unit 316 are coupled to bus 310 for communicating information and command selections to processor 302. Also coupled to processor 302 through bus 310 is an input/output (I/O) interface 318, which can be used to control and transfer data to electronic devices (printers, other computers, etc.) connected to computer system 300.

It should be noted that the architecture of FIG. 3 is provided only for purposes of illustration, and that a computer used in conjunction with embodiments of the invention is not limited to this specific architecture.

Figure 4:
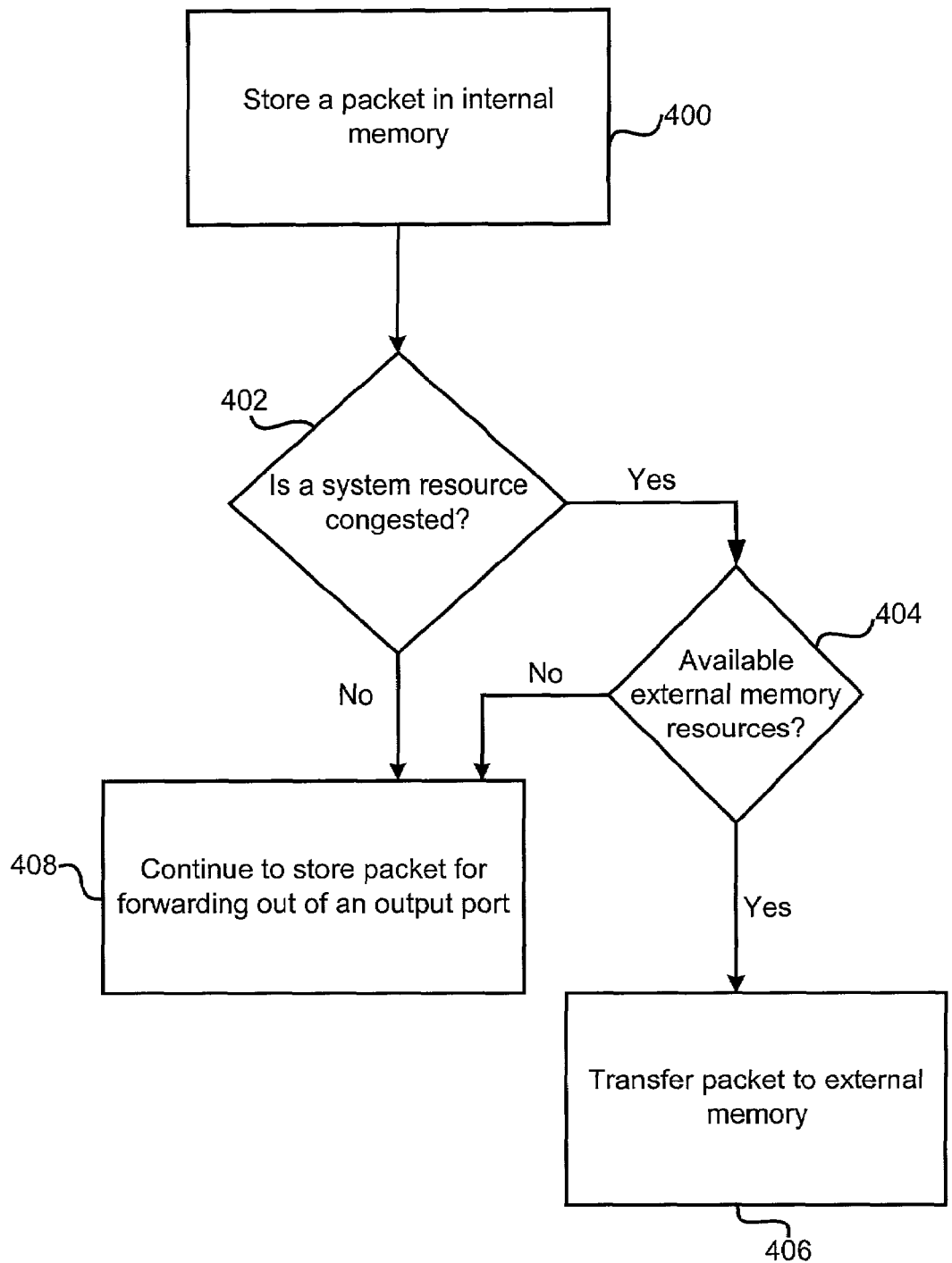
FIG. 4 illustrates a method according to one embodiment of the invention.

Referring to FIG. 4, a method according to one embodiment of the invention is shown. At 400, a packet is stored in the internal memory of system 100. At 402, a determination is made as to whether a system resource is congested. In one embodiment, a determination is made as to whether there is a minimum amount of memory resources available in the system. In one embodiment, a determination is made as to whether there is a minimum amount of transmit ports available. In one embodiment, a determination is made as to whether there is a minimum amount of queues available.

If system resources are congested, at 404, a determination is made as to whether there are external memory resources available. If there are external memory resources available, then at 406, the data packet is transferred to external memory. If system resources are not congested or if external memory resources are not available, then at 408, the data packet continues to be stored in internal memory until the data packet is ready to be forwarded out of an output port.

Figure 5:
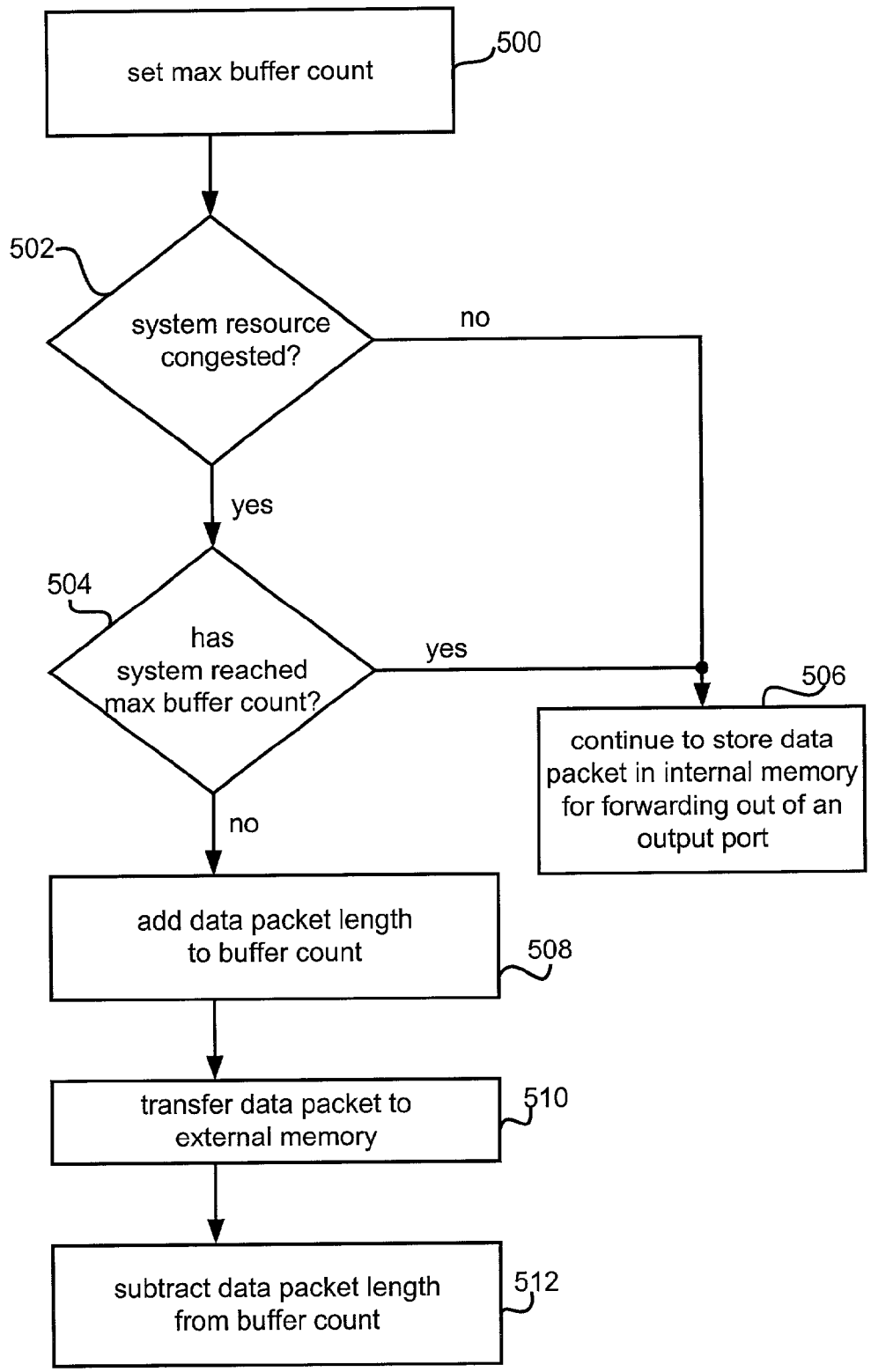
FIG. 5 illustrates a method of checking the availability of memory buffers according to one embodiment of the invention.

In one embodiment, the external memory resources are memory buffers. FIG. 5 shows a method of checking the availability of memory buffers according to one embodiment of the invention. At 500, a maximum buffer count is set to limit the amount of memory buffers that are used at any time by data packets awaiting transfer from internal memory to external memory. When a data packet is received through an input port, at 502, the control unit 106 determines whether a system resource is congested. If a system resource is congested, at 504, a determination is made as to whether the maximum buffer count has been reached. If system resources are not congested or the system has reached the maximum buffer count, then at 506, the data packet continues to be stored in internal memory until the data packet is forwarded out of an output port.

If the maximum buffer count has not been reached, indicating that there are memory buffers available, then, at 508, the length of the data packet will be added to the buffer count. At 510, the data packet is transferred from internal memory to external memory. Then, at 512, the data packet length is subtracted from the buffer count.

Figure 6:
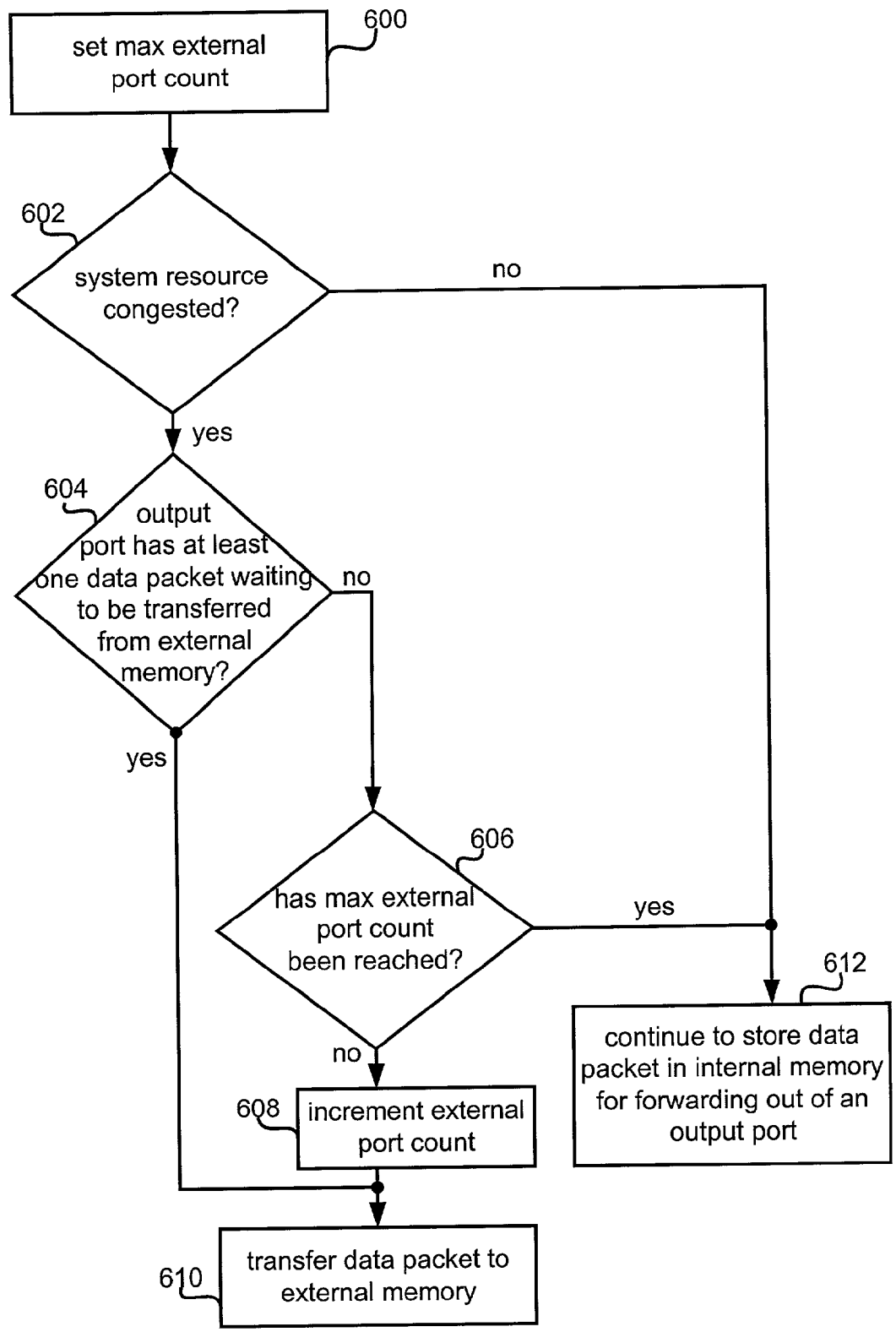
FIG. 6 illustrates a method of checking the availability of active external memory ports according to one embodiment of the invention.

In one embodiment, the external memory resources are active port queues in the external memory. FIG. 6 shows a method of checking the availability of active external memory ports according to one embodiment of the invention. At 600, a maximum active external port count is set to limit the number of output ports that have at least one data packet stored in external memory awaiting transfer out of the ports. When a data packet is received through an input port, at 602, the control unit 106 determines whether a system resource is congested. If a system resource is congested, then at 604, a determination is made as to whether another data packet in external memory is awaiting transfer out of the same output port. In one embodiment, each output port has a corresponding flag that indicates whether there is at least one data packet stored in external memory that is waiting to be transferred out of the port.

If there is already another data packet in external memory awaiting transfer out of the same output port, then at 610, the data packet is transferred to external memory. If there is no other data packet in external memory awaiting transfer out of the same output port, then at 606, a determination is made as to whether the maximum external active port count has been reached. If the maximum external active port count has not been reached, then at 608, the external active port count is incremented. Then, at 610, the data packet is transferred to external memory. If the maximum external active port count has been reached or system resources are not congested, then at 612, the data packet continues to be stored in internal memory for forwarding out of an output port.

Figure 7:
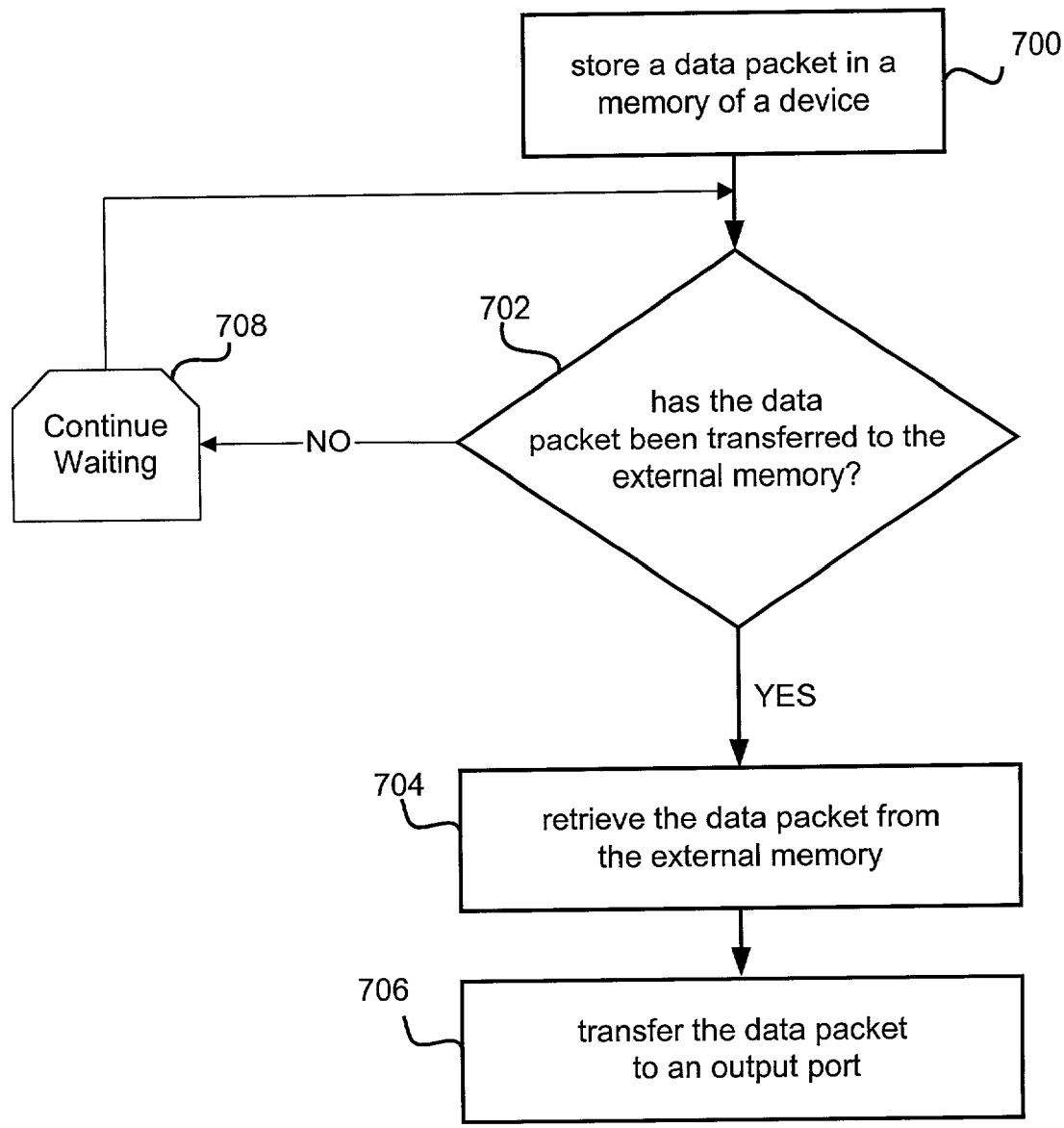
FIG. 7 illustrates a synchronization method according to one embodiment of the invention.

Referring to FIG. 7, a synchronization method according to one embodiment of the invention is shown. At 700, a data packet is stored in the internal memory. At 702, a determination is made as to whether the data packet has been transferred to the external memory. If so, at 704, the data packet is retrieved from the external memory. Then, at 706, the data packet is transferred to an output port. If the data packet has not been transferred to the external memory, at 708, the process waits until the data packet is transferred to the external memory.

In one embodiment of the invention, a determination is made as to whether to transfer the data packet to the external memory based on congestion of system resources before determining whether the data packet has been transferred to the external memory. If device resources are not congested, the data packet continues to be stored in the internal memory. Otherwise, the data packet will be transferred to the external memory. If the data packet is to be transferred to external memory, a token may be generated for the data packet, and the token may be added to the end of memory queue 202 that represents the order in which data packets will be transferred to the external memory.

In one embodiment of the invention, a second token is generated for the data packet and the second token is added to the end of output queue 204 that represents the order in which data packets will be transferred from the internal or external memory to an output port. In this case, a determination is made as to whether the data packet has been transferred to the external memory when the second token reaches the head of the output queue. If the data packet has been transferred to the external memory, then the data packet is retrieved from external memory and transferred to an output port. Otherwise, no attempt is made to transfer the data packet from external memory to an output port until the data packet has been transferred to the external memory.

In one embodiment, the determination as to whether the data packet has been transferred to external memory is made by counting the number of data packets transferred to the external memory and counting the number of data packets transferred from external memory to an output port. The data packet is transferred from the external memory to an output port if the number of data packets transferred to the external memory exceeds the number of data packets transferred from the external memory to an output port.

In one embodiment, a counter is incremented each time a data packet is transferred to the external memory. The counter is decremented each time a data packet is transferred from the external memory to an output port. A data packet in external memory is transferred to the output port if the counter is greater than zero.

This synchronization method ensures that no attempt is made to transfer a data packet out of the external memory to an output port when the data packet is still being stored in the internal memory.

As will be appreciated by those skilled in the art, the content for implementing an embodiment of the method of the invention, for example, computer program instructions, may be provided by any machine-readable media which can store data that is accessible by system 100, as part of or in addition to memory, including but not limited to cartridges, magnetic cassettes, flash memory cards, digital video disks, random access memories (RAMs), read-only memories (ROMs), and the like. In this regard, the system 100 is equipped to communicate with such machine-readable media in a manner well-known in the art.

It will be further appreciated by those skilled in the art that the content for implementing an embodiment of the method of the invention may be provided to the system 100 from any external device capable of storing the content and communicating the content to the system 100. For example, in one embodiment, the system 100 may be connected to a network, and the content may be stored on any device in the network.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
   storing a data packet in an internal memory of a device; and
   transferring the data packet from the internal memory to an external memory that is external to the device if a minimum amount of resources of the device are unavailable and a maximum buffer count has not been exceeded, wherein the maximum buffer count is set to limit the amount of memory buffers that are used by data rackets awaiting transfer from the internal memory to the external memory.

2. The method of claim 1, wherein transferring the data packet to an external memory if a minimum amount of resources of the device are unavailable comprises transferring the data packet to an external memory if a minimum amount of memory resources in the device are unavailable.

3. The method of claim 1, wherein transferring the data packet to an external memory if a minimum amount of resources of the device are unavailable comprises transferring the data packet to an external memory if a minimum amount of transmit ports are unavailable.

4. The method of claim 1, wherein transferring the data packet to an external memory if a minimum amount of resources of the device are unavailable comprises transferring the data packet to an external memory if a minimum amount of transmit queues are unavailable.

5. The method of claim 1, wherein transferring the data packet to an external memory if a minimum amount of resources of the device are unavailable comprises transferring the data packet to an external memory if a minimum amount of resources of the device are unavailable and active port queues in the external memory are available.

6. An apparatus comprising:
   an internal memory to store a data packet; and
   a control module to select to transfer the data packet from the internal memory to one of a memory external to the apparatus and an output port of the apparatus depending on congestion of resources within the apparatus and whether a maximum buffer count has been exceeded, wherein the maximum buffer count is set to limit the amount of memory buffers that are used by data packets awaiting transfer from the internal memory to the external memory.

7. The apparatus of claim 6, wherein the control module to select to transfer the data packet from the internal memory to one of an external memory and an output port depending on congestion of memory resources.

8. The apparatus of claim 7, wherein the memory resources map to the output port.

9. The apparatus of claim 8, wherein the memory resources include a data packet queue associated with the output port.

10. The apparatus of claim 7, wherein the memory resources map to an input port.

11. The apparatus of claim 6 wherein the control module is further for selecting to transfer the data packet from internal memory to one of the memory external to the apparatus and the output port depending on the availability of active port queues in the memory external to the apparatus.

12. An article of manufacture comprising:
a machine accessible medium including content that when accessed by a machine causes the machine to:
store a data packet in a memory internal to a device; and
transfer the data packet to a memory external to the device if a device resource is congested and there are available memory buffers for data packets awaiting transfer from the internal memory to the external memory.

13. The article of manufacture of claim 12, wherein a machine accessible medium comprising content that when accessed by a machine causes the machine to transfer the data packet to a memory external to the device if the device resource is congested comprises a machine accessible medium comprising content that when accessed by a machine causes the machine to transfer the data packet to a memory external to the device if the internal memory is congested.

14. The article of manufacture of claim 12, wherein a machine accessible medium comprising content that when accessed by a machine causes the machine to transfer the data packet to a memory external to the device if the device resource is congested comprises a machine accessible medium comprising content that when accessed by a machine causes the machine to transfer the data packet to a memory external to the device if a transmit port of the device is congested.

15. The article of manufacture of claim 12, wherein a machine accessible medium comprising content that when accessed by a machine causes the machine to transfer the data packet to a memory external to the device if the device resource is congested comprises a machine accessible medium comprising content that when accessed by a machine causes the machine to transfer the data packet to a memory external to the device if a transmit queue associated with a transmit port of the device is congested.

16. The article of manufacture of claim 12, wherein a machine accessible medium comprising content that when accessed by a machine causes the machine to transfer the data packet to a memory external to the device if the device resource is congested comprises a machine accessible medium comprising content that when accessed by a machine causes the machine to transfer the data packet to a memory external to the device if the device resource is congested and there are available active port queues in the external memory.

17. A system comprising:
a first memory to store a data packet;
a second memory coupled to the first memory;
a processor coupled to the first memory and the second memory via a bus, and
logic coupled to the first memory and the second memory to select to transfer the data packet from the first memory to one of the second memory and an output port depending on congestion of resources and whether a maximum buffer count has been exceeded, wherein the maximum buffer count is set to limit the amount of memory buffers that are used by data packets awaiting transfer from the first memory to the second memory.

18. The system of claim 17, wherein logic coupled to the first memory and the second memory to select to transfer the data packet from the first memory to one of the second memory and an output port depending on congestion of resources comprises logic coupled to the first memory and the second memory to select to transfer the data packet from the first memory to one of the second memory and an output port depending on congestion of memory resources.

19. The system of claim 17, wherein the memory resources map to the output port.

20. The system of claim 17, wherein the memory resources include a data packet queue associated with the output port.

21. The system of claim 17 wherein the logic is coupled to the first memory and the second memory to further select to transfer the data packet from the first memory to one of the second memory and an output port depending on the availability of active port queues in the memory external to the apparatus.

22. An apparatus comprising:
a plurality of input ports to receive data packets;
an internal memory that maps to at least one of the input ports to store one of the data packets; and
a control module to select to transfer the data packet from the internal memory to one of a memory external to the apparatus and an output port of the apparatus depending on congestion of the internal memory per input port if a minimum amount of resources of the device are unavailable and a maximum buffer count has not been exceeded, wherein the maximum buffer count is set to limit the amount of memory buffers that are used by data packets awaiting transfer from the internal memory to the external memory.

23. The apparatus of claim 22 wherein the internal memory further maps to the output port and the control module is further for selecting to transfer the data packet from internal memory to one of the memory external to the apparatus and the output port depending on congestion of the internal memory per output port.

24. The apparatus of claim 22, wherein the control module is further for selecting to transfer the data packet from internal memory to one of the memory external to the apparatus and the output port depending on the availability of active port queues in the memory external to the apparatus.

* * * * *

UNITED STATES PATENT AND TRADEMARK OFFICE
CERTIFICATE OF CORRECTION

PATENT NO. : 7,293,130 B2  Page 1 of 1
APPLICATION NO. : 10/159317
DATED : November 6, 2007
INVENTOR(S) : Saxena et al.

It is certified that error appears in the above-identified patent and that said Letters Patent is hereby corrected as shown below:

In column 6, at line 21, delete "rackets", and insert --packets--

Signed and Sealed this

Thirteenth Day of May, 2008

JON W. DUDAS
*Director of the United States Patent and Trademark Office*